July 23, 1940.  R. L. BRIGGS  2,209,108

ROTARY TIMING APPARATUS FOR ELECTRIC CIRCUITS

Filed Dec. 14, 1938  2 Sheets-Sheet 1

Inventor
Rufus L. Briggs,

July 23, 1940.  R. L. BRIGGS  2,209,108
ROTARY TIMING APPARATUS FOR ELECTRIC CIRCUITS
Filed Dec. 14, 1938  2 Sheets-Sheet 2
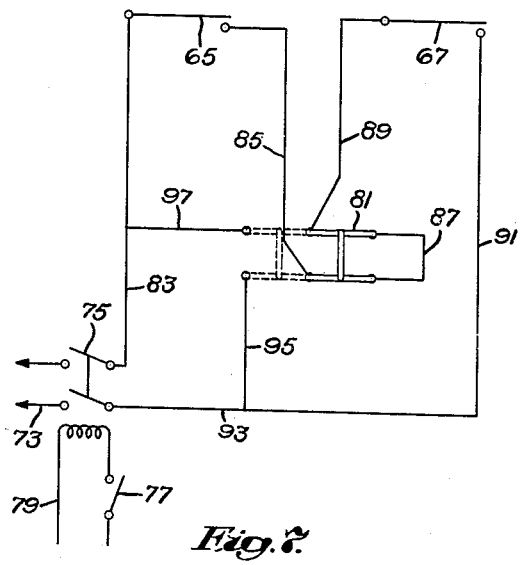
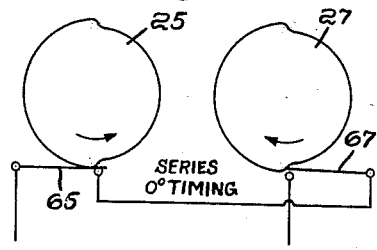
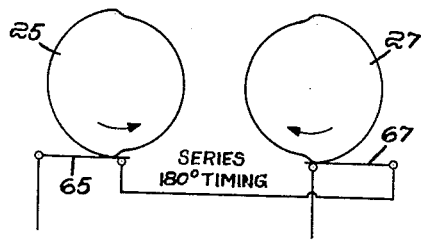
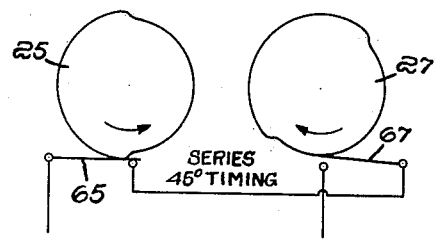
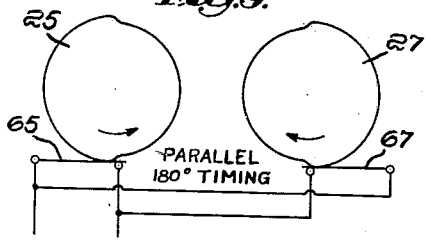
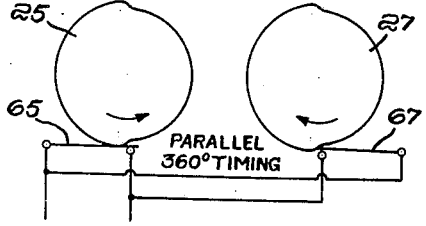
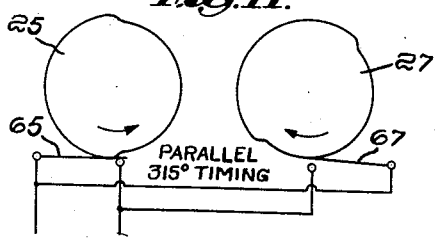
Inventor:
Rufus L. Briggs, Patented July 23, 1940

2,209,108

UNITED STATES PATENT OFFICE 2,209,108

ROTARY TIMING APPARATUS FOR ELECTRIC CIRCUITS

Rufus L. Briggs, Melrose, Mass., assignor to Thomson-Gibb Electric Welding Company, Lynn, Mass., a corporation of Massachusetts Application December 14, 1938, Serial No. 245,640

9 Claims. (Cl. 161—1)

This invention relates to rotary electric control switches or timing devices for rapid, alternate, periodic closing and opening of an electric circuit. While having useful application to other purposes, the control switch herein disclosed is of particular utility in electric welding where the welding current is required to be applied to or shut off at rapidly recurring intervals. Different conditions in welding and different classes of work to be welded require a wide range in the persistence of the welding current for any given interval. Provision is herein made for the quick and simple adjustment of the period of current flow so that its persistence may be adjusted to any desired period in any one cycle of operation of the switch and the adjustment may be made without stopping or interfering with the rotation of the switch.

The control switch as herein illustrated is particularly adapted for controlling the energizing of large capacity electron tubes which are placed in the welding current circuit and themselves control directly the intervals of welding current persistence.

The invention will be best understood by reference to the following description, taken in connection with the accompanying illustration of one specific embodiment thereof, while its scope will be more particularly pointed out in the appended claims.

In the drawings:

Fig. 5 shows diagrammatically wiring connections for the switch; and

Figure 1:
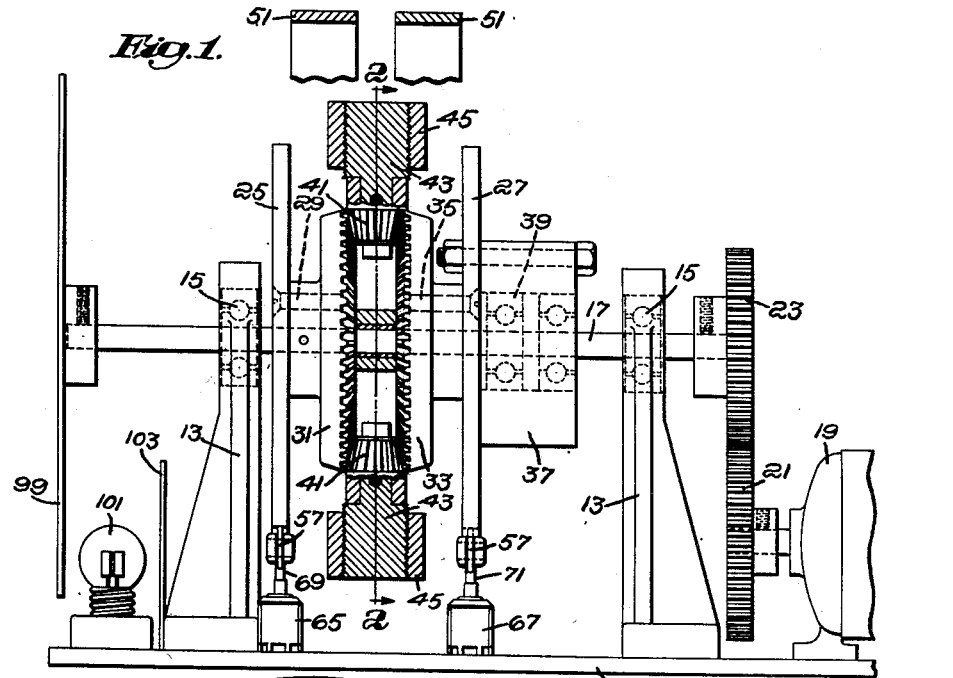
Fig. 1 is a front elevation, in partial section, showing parts of a rotary switch embodying one form of the invention.

Figs. 6 to 11 inclusive show diagrammatically various adjustments of the switch and the switch connections to secure widely varying periods of current persistence for any one cycle of operation of the switch.

Referring to the drawings and to the illustrative embodiment of the invention, the switch parts (Fig. 1) are mounted on a base 11 supporting the standards 13, the latter providing bearings 15 for the driving shaft 17. The shaft is driven by a motor 19 through gears 21 and 23, which may be changed to secure different speeds of rotation for the driving shaft. The motor 19 may be driven at any desired rate but a reasonably high speed is contemplated, as, for example, of the order of one or more thousand revolutions per minute.

The active members of the switch comprise two circular rotary disk cams 25 and 27, each having a raised portion or lift extending for substantially 180° of its periphery (see Figs. 6–11). These cams are rotated at the same speed by the motor 19, provision being made, however, such that the angular relationship between the cams may be adjusted at will while the cams are in rotation and without stoppage of the device. A simple means for effecting this adjustment is a form of gearing of the differential or equalizing type interposed between the cams. In the specific form here shown this effects a rotation of the cams at the same speed but in opposite directions, the arrangement being as follows:

The cam 25 is fixedly secured by screws 29 to the bevel gear 31, which in turn is pinned or otherwise secured to the driving shaft 17 to rotate therewith. One face of the cam 27 is fixedly secured to the bevel gear 33 by screws 35, while its opposite face is bolted to the hub member 37 mounted to turn on the driving shaft through bearings 39, so that the cam 27 with the bevel gear 33 and hub 37 rotate as one member.

Rotation of the bevel gear 31 with its cam 25 effects the rotation in the opposite direction of the bevel gear 33 and cam 27 through means of diametrically opposite beveled pinions 41, one such pinion being in mesh with each of the two opposite bevel gears 31 and 33. The beveled pinions 41 are positioned diametrically opposite each other, being mounted to turn each on a stud 43 fixed in a differential supporting ring 45 (Figs. 2 and 3) which encircles the gearing. This ring is mounted on and concentrically with the driving shaft 17 by means of the diametrically arranged connecting piece 47, so that it may be turned about the driving shaft, carrying with it to different angular positions the beveled pinions 41.

Figure 2:
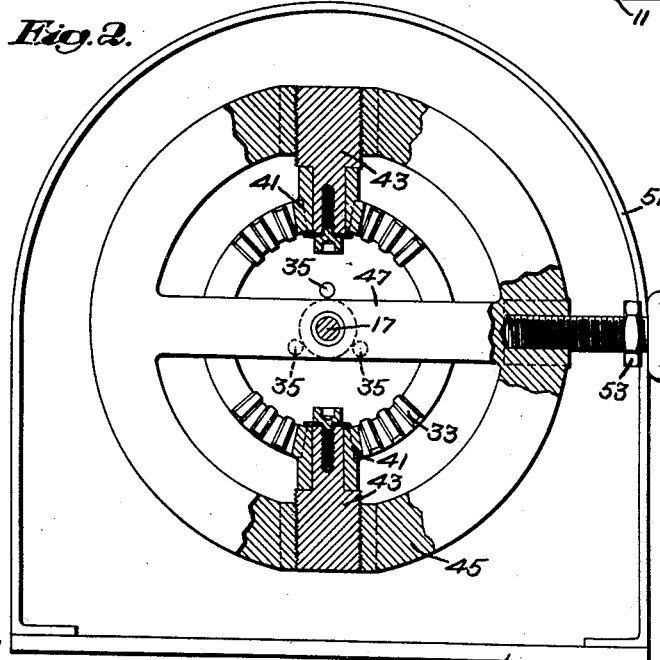
Fig. 2 is a central vertical section, on the line 2—2 in Fig. 1, with certain parts removed but showing the differential driving mechanism for the switch and illustrating the differential ring support utilized for its adjustment.
Figure 3:
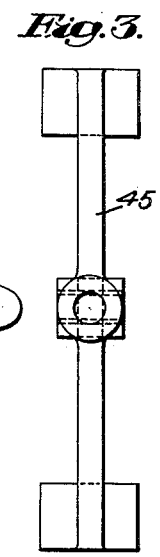
Fig. 3 is an edge view of the differential adjusting ring.

The differential ring is normally held at a fixed angular position, as, for example, the horizontal position shown in Fig. 2, but may be given an angular adjustment about the shaft 17 by means of the handle 49 which is secured to the ring. This handle protrudes through a slot formed between two straps or plates 51 which constitute a stationary quadrant member. The handle is provided with a threaded collar 53 which engages the inner faces of the straps and with a threaded wing nut 55 which engages the outer faces and by means of which the handle may be clamped in any adjusted position on the quadrant.

The angular adjustment of the differential ring with the beveled pinions carried thereby, and which may take place without the stoppage of the rotation of the cams, effects a shifting of the angular position of the cam 27 with relation to the oppositely rotating cam 25 for purposes hereinafter described.

Figure 4:
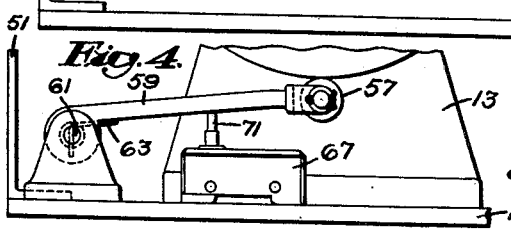
Fig. 4 is a fragmentary side elevation showing one of the cam operated switches in relation to its actuating cam.

The periphery of each cam at its under side engages a cam roll 57 (Fig. 4) carried at the end of a lever arm 59 pivoted at 61, the roll being pressed upward and held against the cam by a spring 63 forcing the lever upward.

The under side of each lever bears against the top of a spring-lifted push button or plunger protruding from the casing of a circuit controlling switch, the type of switch being such as effects a quick make or break of the controlled circuit. There are two separate switches, one 65 for the cam 25 and the other 67 for the cam 27, with respective push buttons 69 and 71. The arrangement is such that when the cam lift of either cam engages the underlying cam roll it serves to depress the push button or plunger and close the switch. When the cam lift passes off the cam roll, pressure of the plunger is relieved, the latter rises and acts to open the switch.

A diagram of the wiring connections for the switches 65 and 67 is shown in Fig. 5, the switches being so arranged that they may be quickly connected either in series or parallel at the will of the operator. The circuit 73 represents the circuit employed for electrical actuation of the device controlling the firing or energizing of the electronic tubes which control the supply of current to the welder. Any of the usual devices and circuiting arrangements for such electrical actuation may be employed, and since these features and the use of such electronic tubes are well understood they are not herein shown. It is understood, however, that the instant the actuating circuit 73 is closed, the electronic tubes are fired or energized and the flow of welding current continues until the circuit 73 is opened, after which the welding current ceases as soon as zero current value is reached in the cycle of the alternating current supplied to the welder.

In order to cut out the controlling effect of the switch cams on the actuating circuit 73 so that such cams may be driven without stoppage during the periods when the welder is not intended to be operated, a main cut-out switch 75 is employed which may be actuated through a switch 77, such as a push button, conveniently located with relation to the operator, this in turn actuating the switch 75 electro-magneticaly through the relay circuit 79.

To change the circuiting of the switches 65 and 67 from series to parallel arrangement, or vice versa, a double-throw, double-pole switch is used conveniently represented at 81, but which in practice may be of the snap type operated by a button, and also conveniently located with relation to the operator.

When the switch 81 is in the position indicated by full lines in Fig. 5, the switches 65 and 67 are serially connected, the circuit being from one terminal of the switch 75 through conductor 83, switch 65, conductor 85, switch 81, conductors 87 and 89, switch 67, and conductors 91 and 93, back to the other terminal of switch 75.

When the switch 81 is in the position indicated by dotted lines in Fig. 5, the switches 65 and 67 are connected in parallel. In that case, the circuit through switch 65 is established from one terminal of the switch 75, through conductor 83, switch 65, and conductor 85 to switch 81, and thence through conductors 95 and 93 to the remaining terminal of switch 75. The circuit for switch 67 is from one terminal of the switch 75, through conductors 83 and 97 to switch 81, and thence through conductor 89, switch 67, and conductors 91 and 93 to the remaining terminal of switch 75.

By the described adjustment of the differential ring 45, combined with the change of the connection of switches 65 and 67 from series to parallel, or vise versa, a condition may be quickly established, at the will of the operator and without stoppage of the rotation of the switch cams, under which switches 65 and 67 may be timed to close the controlled circuit and hold it closed for substantially any desired portion of one complete rotation of the cams.

With the series connection of the switches 65 and 67, by the adjustment of the ring 45 and the resulting change in the relation of the cams, a timed closure may be had varying from substantially 0° to 180° of the rotation of the cams. With the parallel connection of the switches, a timed closure may be had by the adjustment of the ring varying from substantially 180° to 360°.

The effect of adjusting the ring 45 in the case of the series connection of the switches is indicated by Figs. 6, 7, and 8, where three of the many different resulting relations of the cams are shown.

The relation of the two cams, when it is desired that zero timing or no closure of the controlled circuit should take place during the rotation of the cams, is indicated in Fig. 6. This relation is determined by the position of the ring 45 and its handle 49, and for purposes of explanation may be assumed to be that established where the handle is in its horizontal position, as shown in Fig. 2.

It will be observed that movement of the handle 49 shifts the angular relation of the cam 27 with relation to the cam 25 by an amount equivalent to twice the angle through which the handle is moved. Accordingly, if the handle is moved about the quadrant through 90° to a vertical or upright position, the relationship of the cam 27 to the cam 25 has been altered by 180°, or from that shown in Fig. 6 to that shown in Fig. 7, where a timing of substantially 180° takes place, or, in other words, the closure of the circuit for each one-half revolution of the cams.

It will be seen that in the relationship shown in Fig. 6, the lift on the cam 27 releases it cam roll and opens the switch 67 at substantially the same time that the lift on the cam 25 depresses its cam roll and closes the switch 65. The switch 67 remains open for the succeeding one-half revolution, at substantially the end of which the cam 27 in turn opens its switch 65, the circuit therefore remaining open through one or the other of the two switches throughout the entire rotation of the cams.

In the relationship shown in Fig. 7, and at the rotation phase therein indicated, the series circuit is being closed through both switches at the same instant and remains closed for one-half a rotation of the cams, but at the end of that one-half rotation both switches are opened, giving a timing closure of 180°.

By setting the handle 49 to positions intermediate the horizontal and vertical, any timing relation between 0° and 180° may be had. An example of 45° timing is indicated in Fig. 8, where the handle has been moved through 22½° from its horizontal position, shifting the cam 27 in the direction of its rotation through 45° from the relationship indicated in Fig. 6. In this relationship, at the the rotation phase indicated, switch 67 is opened and switch 65 closed. After a succeeding rotation through 135° has taken place, switch 67 then closes and switch 65 remains closed for a further cam rotation of 45°, thereby giving a timing closure for the series circuit of 45° for each rotation of the cams.

Conditions pertaining when parallel connections are established through the switches 65 and 67 are indicated in Figs. 9, 10 and 11. With the handle 49 in the vertical position, the cams have the relationship indicated in Fig. 9, which is the same as in Fig. 7, and both switches remain closed for one-half a revolution of the cam, a timing closure of 180° resulting as before.

If the handle is moved to the horizontal position, the cams have the relationship indicated in Fig. 10, the same as in Fig. 6. In this case, however, the closure of either switch closes the controlled circuit. In this relationship of the cams and at the rotation phase indicated, the switch 65 closes and remains closed for the next succeeding one-half revolution, at the completion of which the switch 67 closes and remains closed for the succeeding one-half revolution, so that a timing closure of the controlled circuit of 360° results, or one continuing for the entire period of each rotation of the cams.

Similarly, positions of the handle 49 intermediate the horizontal and vertical provide any desired timing closure between 180° and 360°.

Moving the handle, for example, through 22½° from horizontal establishes a relationship of the cams shown in Fig. 11, the same as in Fig. 8. At the rotation phase indicated, the controlled circuit is being closed through the switch 65 and remains closed until after switch 67 is itself closed following a succeeding rotation of 135°, whereupon the switch 67 closes and maintains the circuit closed for a further 180° of rotation, providing an aggregate closure of 315° for the rotation of the cams.

The motor 19 may be a simple induction motor, unsynchronized with the current of the welding circuit. If it is desired, however, to synchronize the operation of the rotary switch with the alternations of the current in the welding circuit, the motor may be a synchronous motor operating synchronously with the welding current, as by being supplied with current from the welding circuit. In that case provision for adjustment between the motor and the switch may be made, such that, if desired, the rotary switch, also synchronously operated, will close or open its control circuit at the point of zero current value in the cycle of the welding current, or the switch, synchronously operated, may be left to open or close the circuit at points other than at zero current value. In the case of synchronous operation of the switch, the speed change gears 21 and 23 provide means for varying the number of welding current cycles taking place during any single rotation of the switch.

Any usual means may be employed for visually determining the timing which is taking place in the welding circuit, such as the stroboscopic disk 99 on the shaft 19, indicated in Fig. 1, used in connection with a plurality of neon glow lamps, one of which, 101, with its reflector 103 is illustrated.

While I have herein shown and described for purposes of illustration one specific embodiment of the invention, it is to be understood that extensive deviations may be made both in the mechanical and electrical details illustrated, all without departing from the spirit of the invention.

I claim:

1. A rotary timing apparatus for the periodic opening and closing of a circuit, comprising a controlled circuit, a pair of circuit making and breaking switches controlling said circuit, means for placing said switches at will in either parallel or series arrangement, a pair of rotary cams one for actuating each of said switches, said cams having each a switch-actuating formation extending over substantially one-half its periphery, means for rotating said cams at the same rate of speed comprising a motor connected to rotate one of said cams, a beveled gear connected to rotate with said cam, an opposite and coaxially arranged beveled gear connected to rotate the remaining cam, a beveled pinion meshing with said gears, and a journaling support for said pinion adjustable to different positions about the axes of the gears while the cams are being driven, thereby to shift the angular relation of the cams and vary the period during which the controlled circuit is opened during any one cycle of cam rotation.

2. A rotary timing apparatus, comprising a controlled circuit, two circuit opening and closing devices in said circuit for effecting periodic opening and closing thereof, the said apparatus including a pair of rotary members, means for effecting a circuit closure for a portion of the rotation of each and means for rotating said members comprising a differential gear having opposite, coaxial, beveled gears of equal pitch, one connected to one of said members and the other to the other member, a motor for driving one of said gears, a beveled pinion meshing with said last named gear and transmitting driving movement to the other gear and to the other member at the same speed but in the opposite direction, and a journaling support for said pinion adjustable to different positions about the axis of the gears while the latter are in rotation thereby to shift the angular relation of said members and vary the timing of circuit closure.

3. A rotary timing apparatus for the periodic opening and closing of a circuit, comprising a controlled circuit, a pair of circuit opening and closing switches for controlling said circuit, means for placing said switches in either series or parallel connection, a pair of rotary cams for actuating said switches, means for rotating said cams at the same speed, each cam having means for closing its switch throughout substantially 180° of its rotation, and means to adjust the relative timing of the cams while the latter are being rotated.

4. A rotary timing apparatus for the periodic opening and closing of a circuit, comprising a controlled circuit, a pair of circuit opening and closing switches for controlling said circuit, a pair of rotary cams for actuating said switches, means for rotating said cams at the same speed, each cam having means for closing its switch throughout substantially 180° of its rotation, and means to adjust the relative timing of the cams while the latter are being rotated.

5. A rotary timing apparatus for the periodic opening and closing of a circuit, the same comprising a controlled circuit, a pair of rotary circuit closing devices operative to control said circuit, with means for driving them at the same speed, means for placing said devices in either series or parallel relation to said controlled circuit, each device having provision for effecting circuit closure for approximately 180° of its cycle of rotation, and means for changing the relative timing of said circuit closing devices while still in rotation.

6. A rotary timing apparatus, comprising a controlled circuit, two circuit opening and closing devices for effecting periodic opening and closing thereof, said devices being adapted to be connected in either series or parallel relation in said circuit, said devices including a pair of rotary members having each means for effecting circuit closure for approximately 180° of its rotation, means for rotating said members at the same speed, and means operative while said members are in rotation for adjusting the relative timing of the circuit closings of said members to provide for a closure of said controlled circuit varying from substantially 0° to 360° of one cycle of rotation.

7. A rotary timing apparatus, comprising a controlled circuit, two circuit opening and closing devices connected in series in said circuit for effecting periodic opening and closing thereof, said devices including a pair of rotary members having each means for effecting circuit closure for approximately 180° of its rotation, means for rotating said members at the same speed, and means operative while said members are in rotation for adjusting the relative timing of their circuit closings to provide for a simultaneous closure varying from substantially 0° to 180° of one cycle of rotation.

8. A rotary timing apparatus, comprising a controlled circuit, two circuit opening and closing devices connected in parallel in said circuit for effecting periodic opening and closing thereof, said devices including a pair of rotary members having each means for effecting circuit closure for approximately 180° of its rotation, means for rotating said members at the same speed, and means operative while said members are in rotation for adjusting the relative timing of their circuit closures to provide for a closure of the controlled circuit varying from substantially 180° to 360° of one cycle of rotation.

9. A rotary timing apparatus, comprising a controlled circuit provided with two circuit opening and closing devices for effecting a periodic opening and closing thereof, means for connecting said devices in either series or parallel relation to said circuit, a pair of rotary members having each means for effecting circuit closure for a portion of its rotation only, means for rotating said members at the same speed, and means for adjusting the relative circuit closure timing of said members while the latter are in rotation.

RUFUS L. BRIGGS.